(12) United States Patent
Kakimoto et al.

(10) Patent No.: US 10,119,865 B2
(45) Date of Patent: Nov. 6, 2018

(54) INFRARED SENSOR HAVING IMPROVED SENSITIVITY AND REDUCED HEAT GENERATION

(71) Applicant: Panasonic Intellectual Property Management Co., Ltd., Osaka (JP)

(72) Inventors: Katsumi Kakimoto, Osaka (JP); Masaaki Saito, Osaka (JP); Yosuke Hagihara, Osaka (JP); Takafumi Okudo, Osaka (JP); Yoichi Nishijima, Osaka (JP); Ryo Osabe, Osaka (JP); Naoki Ushiyama, Mie (JP); Sumio Akai, Mie (JP); Yasufumi Shibata, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 59 days.

(21) Appl. No.: 14/895,927

(22) PCT Filed: May 30, 2014

(86) PCT No.: PCT/JP2014/002866
§ 371 (c)(1),
(2) Date: Dec. 3, 2015

(87) PCT Pub. No.: WO2014/199583
PCT Pub. Date: Dec. 18, 2014

(65) Prior Publication Data
US 2016/0153837 A1 Jun. 2, 2016

(30) Foreign Application Priority Data

Jun. 10, 2013 (JP) .................................. 2013-121505
Sep. 13, 2013 (JP) .................................. 2013-190077

(51) Int. Cl.
*G01J 5/08* (2006.01)
*G01J 5/04* (2006.01)
(Continued)

(52) U.S. Cl.
CPC .......... *G01J 5/0853* (2013.01); *G01J 5/0025* (2013.01); *G01J 5/024* (2013.01); *G01J 5/045* (2013.01);
(Continued)

(58) Field of Classification Search
CPC ...... G01J 5/20; G01J 5/02; G01J 5/024; G01J 5/08; G01J 5/0853; G01J 5/045; G01J 5/0025; G01J 2005/202; G01J 2005/106
(Continued)

(56) References Cited

U.S. PATENT DOCUMENTS 8,969,986 B1 * 3/2015 Yap ..................... H01L 31/0236
257/432
2003/0054179 A1 3/2003 Nakajima et al.
(Continued)

FOREIGN PATENT DOCUMENTS

JP 1-142418 6/1989
JP 1-227929 9/1989
(Continued)

OTHER PUBLICATIONS

International Search Report of PCT application No. PCT/JP2014/002866 dated Jul. 1, 2014.

*Primary Examiner* — David Porta
*Assistant Examiner* — Blake Riddick
(74) *Attorney, Agent, or Firm* — McDermott Will & Emery LLP

(57) ABSTRACT

An infrared sensor, which achieves a low manufacturing cost, or has high sensitivity, or in which an increase in heat capacity is reduced, is provided. The infrared sensor
(Continued)

includes a first infrared absorbing portion, an infrared sensing portion for sensing infrared rays based on infrared rays absorbed by the first infrared absorbing portion, and a plurality of protrusions including metal and disposed apart from each other on a surface of the first infrared absorbing portion. Since an absorption rate of infrared rays is improved, sensitivity can be improved, or an increase in heat capacity can be reduced.

21 Claims, 22 Drawing Sheets

(51) Int. Cl.
  *G01J 5/02* (2006.01)
  *G01J 5/00* (2006.01)
  *G01J 5/20* (2006.01)
  *G01J 5/10* (2006.01)
(52) U.S. Cl.
  CPC .......... *G01J 5/20* (2013.01); *G01J 2005/106* (2013.01); *G01J 2005/202* (2013.01)
(58) Field of Classification Search
  USPC ............................... 250/338.1, 338.4, 338.3
  See application file for complete search history.

(56) References Cited

U.S. PATENT DOCUMENTS

| | | | | |
|---|---|---|---|---|
| 2003/0133489 A1* | 7/2003 | Hirota | ....................... | G01J 5/08 374/121 |
| 2006/0038129 A1* | 2/2006 | Watanabe | ................. | G01J 5/12 250/338.1 |
| 2006/0060788 A1* | 3/2006 | Uchida | ..................... | G01J 5/10 250/343 |
| 2006/0188400 A1 | 8/2006 | Sasaki | | |
| 2007/0031988 A1* | 2/2007 | Agranov | ............. | H01L 27/1462 438/60 |
| 2007/0278605 A1* | 12/2007 | Shibayama | ............... | G01J 5/10 257/432 |
| 2008/0047600 A1 | 2/2008 | Ohashi et al. | | |
| 2009/0184251 A1* | 6/2009 | Karim et al. | ............. | G01T 1/24 250/370.01 |
| 2009/0184246 A1 | 7/2009 | Abe | | |
| 2010/0067016 A1 | 3/2010 | Ueno et al. | | |
| 2010/0127172 A1 | 5/2010 | Nikoobakht | | |
| 2011/0127584 A1* | 6/2011 | Ushiyama | .................. | G01J 5/12 257/252 |
| 2011/0175100 A1* | 7/2011 | Tsuji | ......................... | G01J 5/02 257/66 |
| 2011/0175145 A1* | 7/2011 | Tsuji | ................. | H01L 27/14692 257/252 |
| 2012/0018636 A1* | 1/2012 | Tsuji | ......................... | G01J 5/02 250/338.3 |
| 2012/0061569 A1* | 3/2012 | Noguchi | ................. | G01J 5/024 250/338.3 |
| 2012/0228503 A1* | 9/2012 | Nishikawa | ................ | G01J 5/04 250/338.3 |
| 2013/0093037 A1* | 4/2013 | Kirihara | .................... | G01J 5/04 257/435 |
| 2015/0048249 A1* | 2/2015 | Hedler | .................... | G01J 5/023 250/338.4 |
| 2015/0076651 A1* | 3/2015 | Noguchi | ................. | H01L 35/32 257/467 |

FOREIGN PATENT DOCUMENTS

| | | |
|---|---|---|
| JP | 2003-098338 | 4/2003 |
| JP | 2003-304005 | 10/2003 |
| JP | 2006-226891 A | 8/2006 |
| JP | 2007-292561 | 11/2007 |
| JP | 2008-053615 | 3/2008 |
| JP | 2009-174917 | 8/2009 |
| JP | 2009-175124 | 8/2009 |
| JP | 2010-048803 | 3/2010 |
| JP | 2010-249779 | 11/2010 |
| JP | 2012163347 A * | 8/2012 |
| JP | 2012-177696 | 9/2012 |

* cited by examiner

INFRARED SENSOR HAVING IMPROVED SENSITIVITY AND REDUCED HEAT GENERATION

CROSS-REFERENCE TO RELATED APPLICATIONS

This application is a U.S. national stage application of the PCT International Application No. PCT/JP2014/002866 filed on May 30, 2014, which claims the benefit of foreign priority of Japanese patent applications 2013-121505 filed on Jun. 10, 2013 and 2013-190077 filed on Sep. 13, 2013 the contents all of which are incorporated herein by reference.

TECHNICAL FIELD

The present invention relates to an infrared sensor for sensing infrared rays.

BACKGROUND ART

There is known an infrared sensor including a film-like infrared absorbing portion formed on a semiconductor substrate such as a silicon substrate, a sensing element formed on the infrared absorbing portion, and a switching element for reading out an output of the sensing element (see PTL 1). The infrared absorbing portion has a multilayer structure, in which material, thickness, and the like, are determined such that remaining stress is reduced so as to reduce breakage and operation abnormality of the switching element is reduced. Other techniques are disclosed in, for example, PTLs 2 and 3.

CITATION LIST

Patent Literatures

PTL1: Japanese Patent Unexamined Publication No. 2010-48803
PTL2: Japanese Patent Unexamined Publication No. 2009-174917
PTL3: Japanese Patent Unexamined Publication No. 2007-292561

SUMMARY OF THE INVENTION

However, an infrared sensor including an infrared ray absorbing film such as a metal-oxide film needs a special film-forming device, thus increasing a manufacturing cost. Furthermore, since the infrared-ray absorbing film is porous, may be short of processing resistance. Furthermore, since the infrared ray absorbing film has a film thickness of several µm or more, heat capacity of an infrared absorbing portion may be increased, thus causing a response speed to reduce.

In view of the above-mentioned problems, the present invention has an object to reduce a manufacturing cost. The present invention also has an object to provide an infrared sensor having high sensitivity. The present invention also has an object to provide an infrared sensor in which heat capacity can be reduced.

In order to achieve the above-mentioned objects, there is provided an infrared sensor including a first infrared absorbing portions an infrared sensing portion for sensing infrared rays based on infrared rays absorbed by the first infrared absorbing portion; and a plurality of protrusions including metal or a silicon nitride film and disposed apart from each other on a surface of the first infrared absorbing portion.

The present invention can provide an infrared sensor which achieves a low manufacturing cost, or has high sensitivity, or in which an increase in heat capacity is reduced.

DESCRIPTION OF EMBODIMENTS

Figure 1:
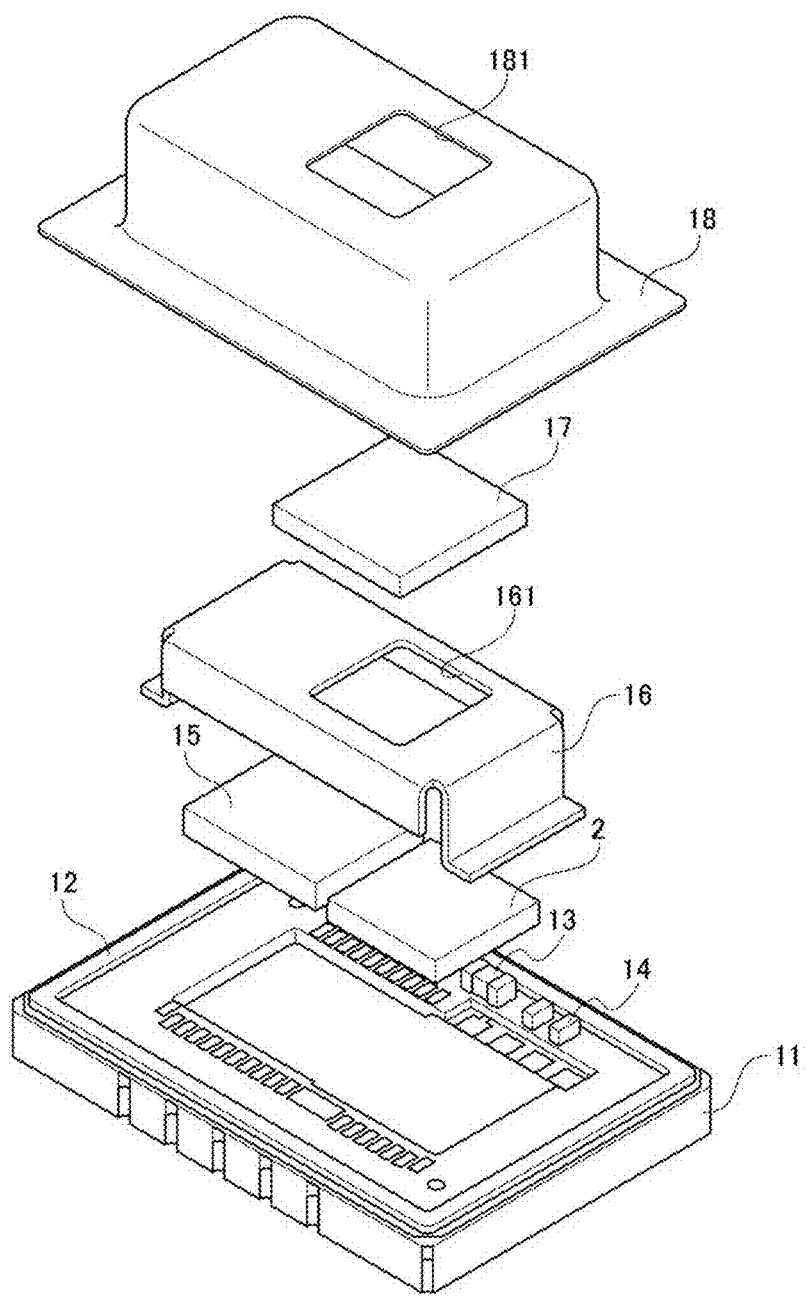
FIG. 1 is a schematic exploded perspective view for illustrating a basic configuration of an infrared sensor in accordance with an exemplary embodiment.

Next, with reference to drawings, exemplary embodiments are described. In the following description for drawings, the same or similar reference numerals are given to the same or similar parts and repeated description therefor may be omitted. However, the drawings are schematically shown, and therefor relation between a thickness and a planar dimension, ratios of thicknesses of layers, or the like, may be different from actual ones. Furthermore, the following exemplary embodiments show examples of devices and methods for embodying the technical idea of the present invention. The technical idea of the present invention is not intended to specify material, shapes, structures, arrangement, and the like, of components. The technical idea of the present invention may be modified variously in a range without contradiction.

(Infrared Sensor)

As shown in FIG. 1, an infrared sensor in accordance with an exemplary embodiment includes substrate 11, sensor chip 2, integrated circuit (IC) 15, shield cover 16, lens 17, and case 18. The infrared sensor in accordance with this exemplary embodiment receives infrared rays, and detects, for example, temperature distribution, a position of a heat source, or the like, within the field of view.

Substrate 11 has substantially a rectangular flat shape, and includes a multilayer substrate such as a ceramic substrate and a resin printed circuit board. Substrate 11 is provided with circuit wiring connected to sensor chip 2, IC 15, or the like. Substrate 11 is connected to ground potential, and has, on a top surface thereof, bonding electrode 12 to be bonded to case 18 thermistor 13 for sensing a temperature for correcting temperature sensed by sensor chip 2, and circuit element 14 such as a resistor. Bonding electrode 12 is formed in a frame shape so as to frame the top surface of substrate 11.

Sensor chip has substantially a rectangular flat shape, and has a light-receiving surface on the top surface thereof. Sensor chip 2 and IC 15 are arranged along the longitudinal direction of substrate 11, and, mounted on the top surface of substrate 11 by for example, die bonding. Sensor chip 2 and IC 15 are electrically coupled to each other via wire 82 formed by wire bonding (see, FIG. 2). IC 15 is electrically coupled to circuit wiring of substrate 11 via wire 83 made of, for example, gold (Au) and aluminum (Al), by wire bonding. Sensor chip 2 and IC 15 may be electrically connected to circuit wiring of substrate 11 by, for example, flip chip.

Shield cover 16 blocks infrared rays entering sensor chip 2 and infrared rays entering IC 15 from out of field of view. Shield cover 16 has substantially a rectangular parallelepiped box-shape whose entire bottom surface is opened. The bottom parts of the side walls of shield cover 16 are bonded to substrate 11 with, for example, conductive resin so as to cover sensor chip 2 and IC 15. Thereby, shield cover 16, together with a shield layer formed on substrate 11, blocks infrared rays. Shield cover 16 is made of, for example, metal material such as covar. Shield cover 16 has rectangular entrance window 161 in a part of the top surface above sensor chip 2. Entrance window 161 is transparent with respect to infrared rays, and is, for example, a though-hole. Entrance window 161 allows infrared rays to enter the light-receiving surface of sensor chip 2.

Lens 17 has substantially a rectangular flat shape, and is a convex lens having a first surface (top surface) formed into a flat surface and a second surface (bottom surface) formed into a convex surface. Lens 17 is disposed above sensor chip 2 and in parallel to the light-receiving surface of sensor chip 2. Lens 17 is configured so as to form an image of infrared rays on the light-receiving surface of sensor chip 2. Lens 17 only needs to have a function of forming an image of infrared rays on the light-receiving surface of sensor chip 2. For example, lens 17 may be formed in such a manner that the both surfaces are formed to have a convex surface, or a first surface is formed to have a concave surface and a second surface is formed to have a convex surface whose curvature is larger than that of the concave surface. The convex surface and the concave surface of lens 17 may be paraboloids having various curvatures.

Case 18 has substantially a rectangular parallelepiped box-shape whose entire bottom surface is opened. Case 18 is made of metal. Case 18 is installed on substrate 11 such that the bottom parts of the side walls thereof are bonded to bonding electrode 12 on substrate 11 with, for example, conductive resin so as to cover shield cover 16. Case 18 has rectangular entrance window 181 in a part of the top surface thereof above sensor chip 2. Entrance window 181 is transparent with respect to infrared rays, and is, for example, a through-hole.

Entrance window 181 has a rectangular shape along lens 17 such that the top surface of lens 17 can be bonded to the periphery of entrance window 181 from below the case 18. The top surface of lens 17 is bonded to the periphery of entrance window 181, so that entrance window 181 holds lens 17. Entrance window 181 allows infrared rays to enter sensor chip 2 via lens 17. Lens 17 is bonded to the periphery of entrance window 181 with, for example, resin, and the bottom parts of the side walls are bonded to bonding electrode 12 of substrate 11, thereby case 18 seals the inside. The inside of case 18 is filled with inert gas such as nitrogen gas, or made to be a vacuum atmosphere.

Figure 2:
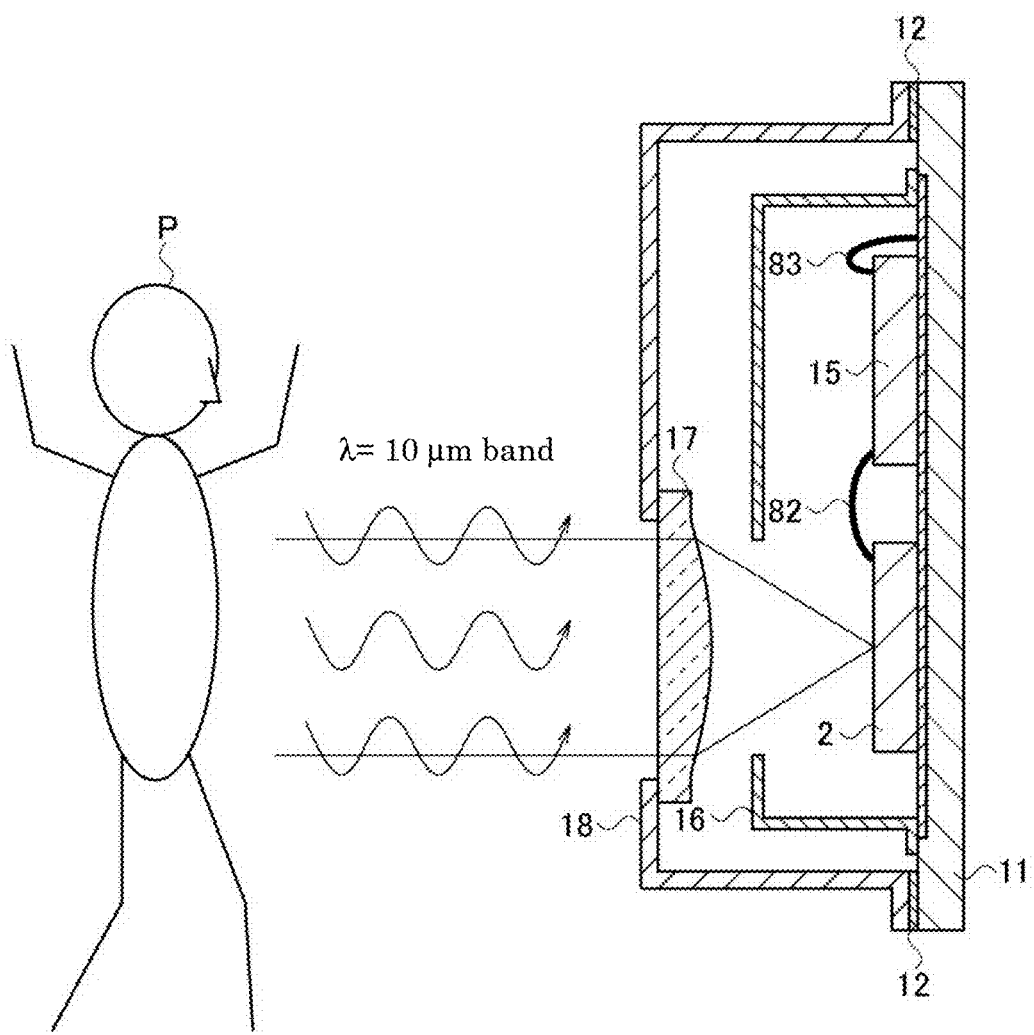
FIG. 2 is a schematic view for illustrating a state in which the infrared sensor receives infrared rays from a subject in accordance with the exemplary embodiment.
Figure 3:
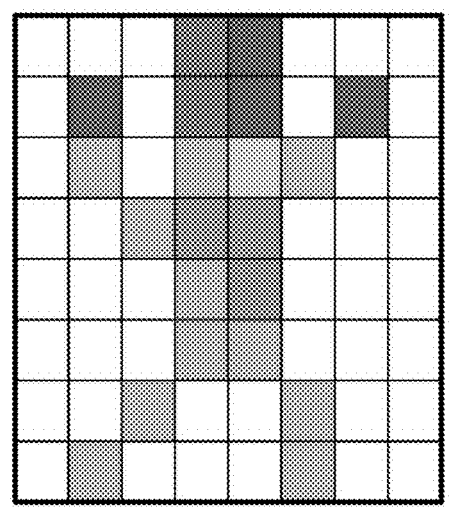
FIG. 3 is a view showing an example of a thermal image to be obtained by an operation of IC included in the infrared sensor in accordance with the exemplary embodiment.

The infrared sensor of the exemplary embodiment receives infrared rays radiated from subject P such as a human body, on the light-receiving surface of sensor chip 2 via lens 17 as shown in FIG. 2. IC 15 is capable of reading an output of sensor chip 2 based on the received infrared rays and outputting it as a thermal image as shown in, for example, FIG. 3.

Figure 4:
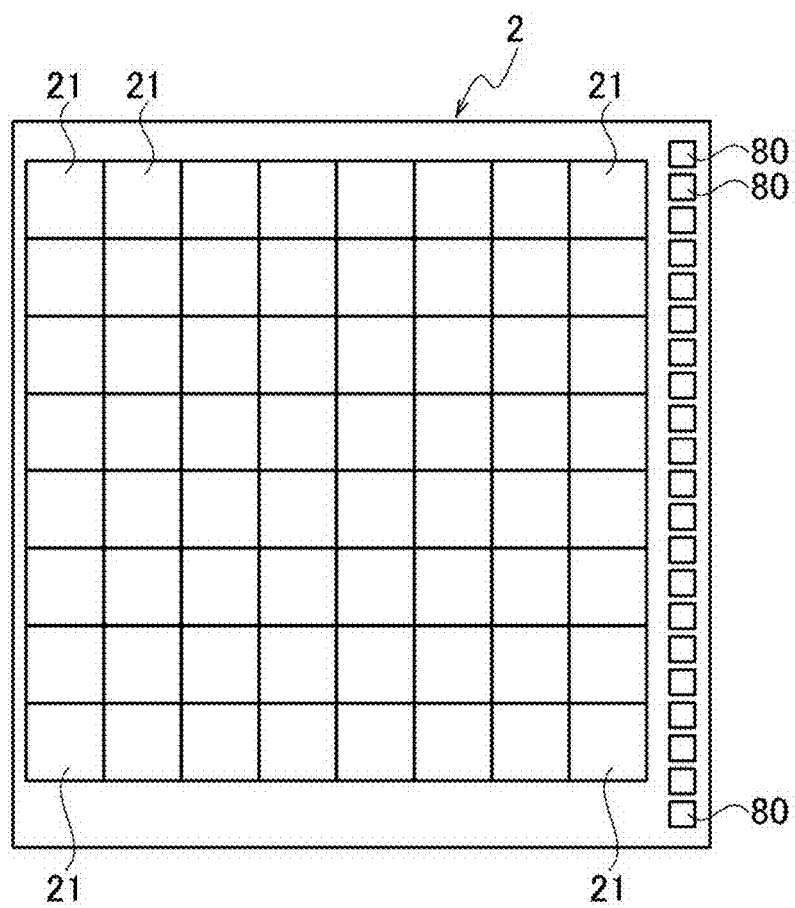
FIG. 4 is a plan view for illustrating a sensor chip included in the infrared sensor in accordance with the exemplary embodiment.

As shown in FIG. 4, sensor chip 2 includes a plurality of pixel portions 21 arranged in, for example, 8×8 lattice, and a plurality of pads 80 connected to pixel portions 21. The plurality of pixel portions 21 constitutes the light-receiving surface of sensor chip 2, and outputs a signal corresponding to the received infrared rays. Each pad 80 is an electrode for inputting and outputting a signal to pixel portion 21.

Figure 5:
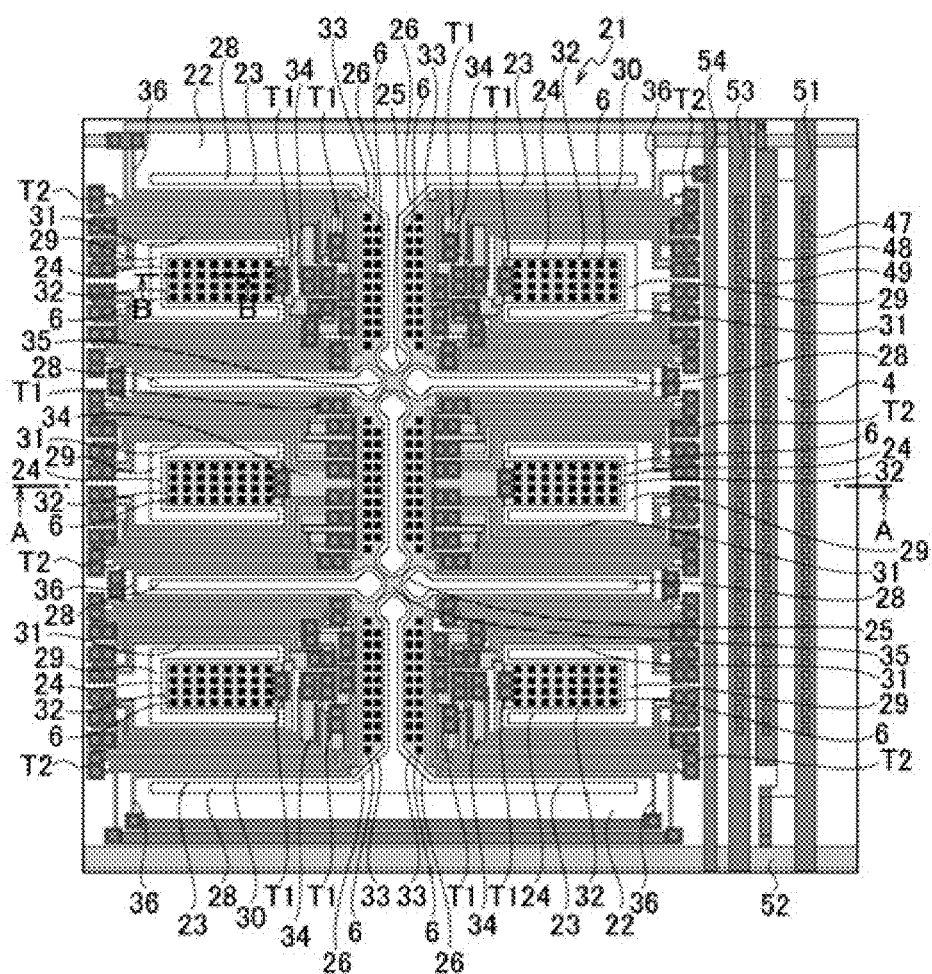
FIG. 5A is a schematic plan view for illustrating a pixel portion of the sensor chip included in the infrared sensor in accordance with the exemplary embodiment.
FIG. 5B is a sectional view seen from the A-A direction of FIG. 5A.
Figure 5:
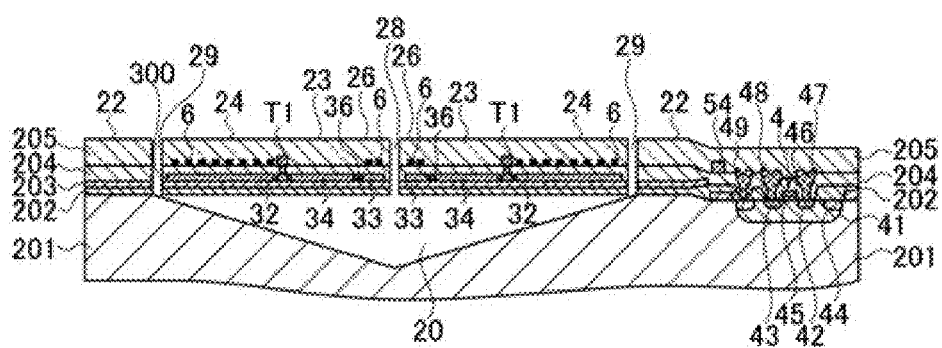

As shown in FIG. 5A, each pixel portion 21 includes substantially frame-like support part 22, a plurality of temperature-sensing portions 23 each supported by support part 22, and MOSFET (metal oxide semiconductor field-effect transistor) 4 formed on one side of support part 22. One pixel portion 21 corresponds to one pixel portion of a thermal image treated by the infrared sensor in accordance with the exemplary embodiment.

Pixel portion 21 mainly includes, for example, semiconductor substrate 201 such as a silicon substrate, thin film layers (202 and 203), interlayer insulating film 204, and passivation film 205, which are laminated sequentially. Thin film layers (202 and 203) include, for example, silicon oxide film ($SiO_2$) 202 having a thickness of about 0.3 µm, and silicon nitride film ($Si_3N_4$) 203 having a thickness of about 0.25 µm, which is formed on the top surface of silicon oxide film 202. Interlayer insulating film 204 is made of, for example, boron phosphorus silicate glass (BPSG), and has a thickness of about 0.8 µm. Passivation film 205 is made of, for example, a non-doped silicate glass (NSG) film, phosphorus silicate glass (PSG), or the like, and has a thickness of about 0.5 µm.

Pixel portion 21 has air-gap 20. Air-gap 20 is formed by selectively removing a top part of semiconductor substrate 201 with support part 22 left on the peripheral edge. Each of temperature-sensing portions 23 has substantially a rectangular flat shape. For example, three each of temperature-sensing portions 23 extend from two sides confronting support part 22. Each temperature-sensing portion 23 is disposed above air-gap 20 so as to close air-gap 20, and is linked and supported by support part 22. Temperature-sensing portions 23 are divided from each other by first slit and third slit 28 penetrating from the top surface of passivation film 205 to the bottom surface of thin film layers (202 and 203). Herein, the extending direction of the first slit is perpendicular to the extending direction of infrared sensing portion 31 on infrared absorbing portion 24. Furthermore, the extending direction of the third slit is perpendicular to the extending direction of the first slit. Note here that "perpendicular" includes "substantially perpendicular" including an acceptable error in design. Corner portions of neighboring temperature-sensing portions 23 are linked to each other by X-shaped linking piece 25.

Each temperature-sensing portion 23 has second slit 29 formed in a U-shape in a plan view and penetrating from the top surface of passivation film 205 to the bottom surfaces of thin film layers (202 and 203). Each temperature-sensing portion 23 includes infrared absorbing portion 24 having a cantilever beam structure by second slit 29. Infrared absorbing portion 24 is connected to the tip side of temperature-sensing portion 23 that is not linked to support part 22.

On the top surface of thin film layers (202 and 203) located in temperature-sensing portion 23, infrared sensing portions 31 are formed. Each infrared sensing portion 31 is a thermopile composed of a plurality of thermocouples which are connected to each other in series. All of infrared sensing portions 31 are connected in series to each other in one pixel portion 21. Each of infrared sensing portions 31 includes polysilicon layer 300 having a thickness of about 0.45 µm junction T1, and cold junction T2, which are formed on the top surface of thin film layers (202 and 203). Polysilicon layer 300 is located between thin film layers (202 and 203) and interlayer insulating film 204.

Hot junctions T1 are formed on the tip side of temperature-sensing portion 23 in such a manner that they are apart from the two sides of support part 22 linked to temperature-sensing portion 23. Hot junctions T1 are biased to the center part such that they are apart from support part 22 in a plurality of regions of temperature-sensing portions 23. As a result, a temperature change of hot junctions T1 can be increased, so that the sensitivity of infrared sensing portion 31 can be improved. Cold junctions T2 are formed on support part 22 at the two sides which are linked to temperature-sensing portion 23.

Polysilicon layer 300 of infrared sensing portion 31, in which hot junctions T1 and cold junctions T2 are alternately connected in series, is doped to be n-type and p-type alternately. The n-type and p-type polysilicon layer 300 constituting infrared sensing portion 31 are separated at hot junction T1 and cold junction T2, and electrically connected by a connection portion made of metal material including Al and the like, at hot junction T1 and cold junction T2.

Polysilicon layer 300 of infrared sensing portion 31 in the vicinity of hot junction T1 is infrared absorbing layer 34 which is formed to have a larger area as compared with the other places so that it readily absorbs infrared rays. In addition, polysilicon layer 300 is formed on infrared absorbing portion 26 as the tip portion of infrared absorbing portion 24 and temperature-sensing portion 23. Polysilicon layer 300 formed on infrared absorbing portion 24 is n-type infrared absorbing layer 32. Polysilicon layer 300 formed on infrared absorbing portion 26 is n-type infrared absorbing layer 33. Corner portions of neighboring infrared absorbing layers 33 are linked to each other in linking piece 25 by reinforcing layer 35 as n-type doped X-shaped polysilicon layer 300.

Sensor chip 2 includes diagnosing heater 36 that is n-type doped polysilicon layer 300, which is laid out over one side of all temperature-sensing portions 23 and all support parts 22. Electrifying diagnosing heater 36 permits detection of a breakage in temperature-sensing portion 23, support part 22, or the like.

Infrared absorbing portions 24 and 26 include a first infrared absorbing portion including thin film layers (202 and 203), polysilicon layer 300, and interlayer insulating film 204, as well as a second infrared absorbing portion including passivation film 205. Each of infrared absorbing portions 24 and 26 includes a plurality of protrusions 6 disposed on the top surface of the first infrared absorbing portion. Protrusions 6 include metal or a silicon nitride film, and are disposed apart from each other. Herein, it is preferable that the plurality of protrusions 6 are disposed at intervals. Protrusion 6 is made of metal including, for example, aluminum (Al), titanium (Ti), tungsten (W), gold (Au), copper (Cu), or the like. In addition, protrusion 6 may be aluminum alloys such as Al—Si, Al—Si—Cu, Al—Cu, or the like or metal nitride such as TiN, or a silicon nitride film. Passivation film 205 as the second infrared absorbing portion is formed on the top surfaces of the first infrared absorbing portion and protrusions 6 so as to cover the plurality of protrusions 6.

Figure 6:
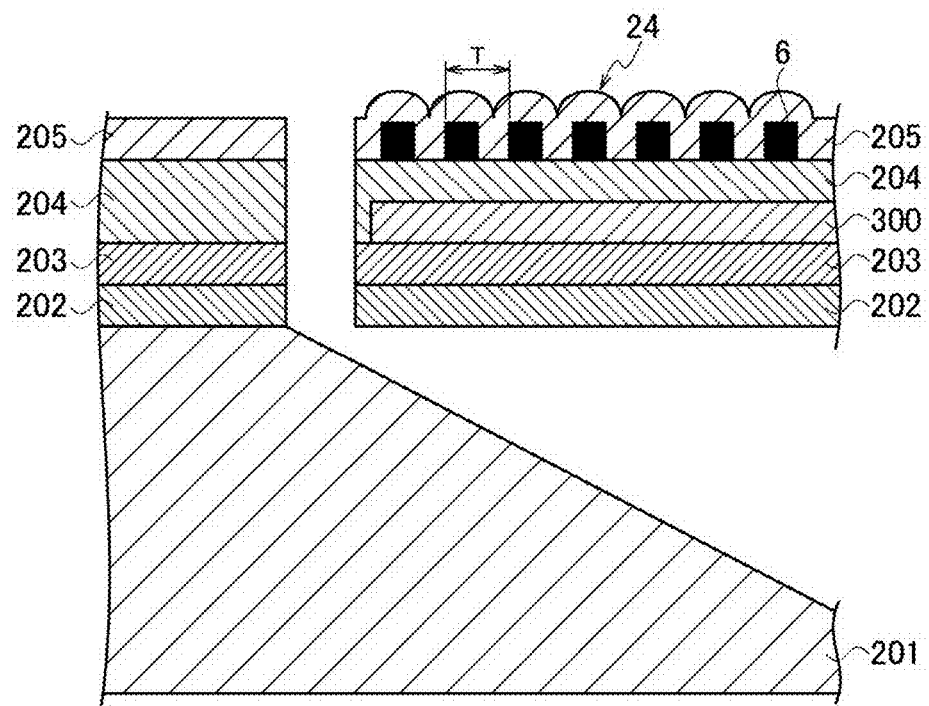
FIG. 6 is an enlarged sectional view seen from the B-B direction of FIG. 5A.

As shown in FIG. 6, the plurality of protrusions 6 are disposed with interval T in a two-dimensional array. Interval T is shorter than the wavelength λ of infrared rays absorbed by infrared absorbing portions 24 and 26. The wavelength λ is a target wavelength of the infrared rays desired to be sensed by the infrared sensor of the exemplary embodiment. For example, the wavelength λ, can be 10 µm when sensing subject P is a human body having a temperature of 310 K. In this case, for example, each of the planar dimensions in the direction of square lattice lines of protrusion 6 can be 2 µm, a gap can be 2 µm, and interval T can be 4 µm.

Since the plurality of protrusions 6 have periodicity corresponding to the wavelength λ, protrusions 6 have a mode of the standing wave corresponding to interval T in the gap therebetween. When the mode of the standing wave and the wavelength of infrared rays from subject P correspond to each other, in the first infrared absorbing portion provided with protrusions 6, an absorption (radiation) rate with respect to the received infrared rays is improved.

Furthermore, in the plurality of protrusions 6, a plasmon, which is collective oscillation of free electrons of metal constituting protrusion 6, is affected by the periodicity and is resonant with infrared rays. Thus, a specific plasmon corresponding to interval T is excited on the surface of protrusion 6. When a propagation vector of the plasmon matches with a wave-number vector of the infrared rays, in the first infrared absorbing portion provided with protrusions 6, an absorption (radiation) rate with respect to the received infrared rays is improved.

Figure 7:
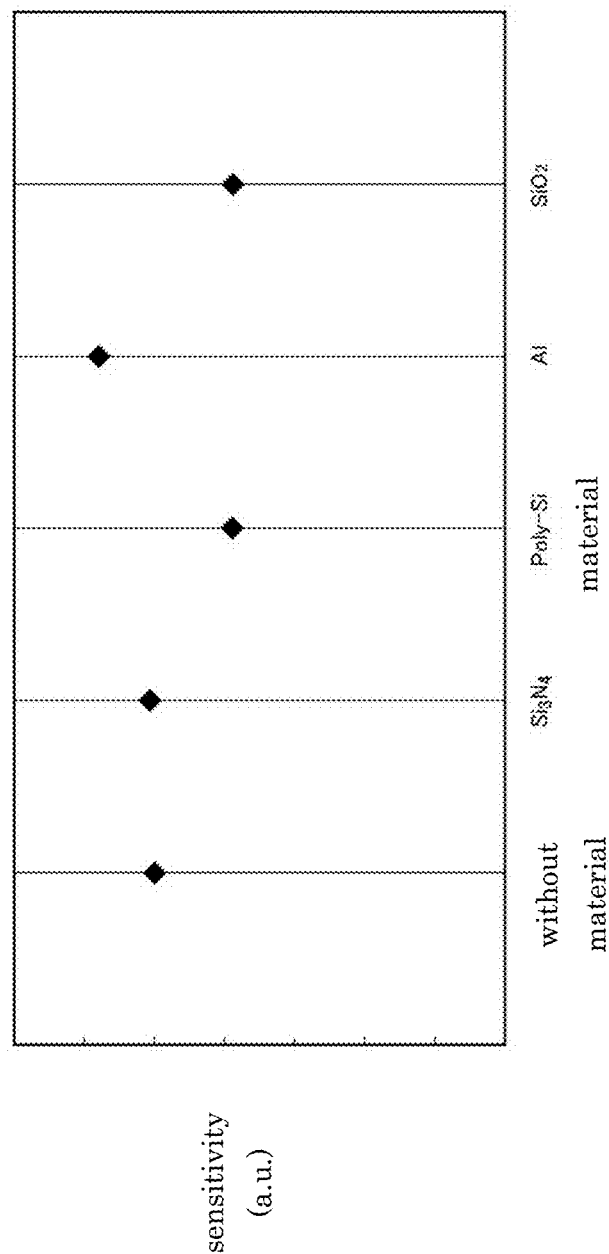
FIG. 7 is a view showing sensitivity of an infrared sensing portion for illustrating an effect by a protrusion included in the infrared sensor in accordance with the exemplary embodiment, and this figure also shows a case in which a protrusion is not provided and a case in which a protrusion formed of material other than metal is provided.

As shown in FIG. 7, the sensitivity of infrared sensing portion 31 of sensor chip 2 including protrusions 6 formed of Al is higher as compared with the case where sensor chip 2 does not include protrusion 6. Furthermore, the sent of infrared sensing portion 31 of sensor chip 2 including protrusions 6 formed of Al is also higher as compared with the case of including protrusions 6 formed of $Si_3N_4$, polysilicon $SiO_2$, respectively. Thus, protrusions 6 made of metal improve the sensitivity of infrared sensing portion 31.

Absorption by the standing wave is remarkable when protrusion 6 is deep in height, and absorption by the plasmon is remarkable when protrusion 6 is shallow in height. The height of protrusion 6 only needs to be determined such that the absorption by the standing wave and the absorption by the plasmon become maximum, and it can be, for example, about 1 µm in thickness.

When the plurality of protrusions 6 are formed corresponding to the wavelength λ on infrared absorbing portions 24 and 26, the absorption rate of infrared rays in infrared absorbing portions 24 and 26 is unproved. When the plurality of hot junctions T1 are disposed on infrared absorbing portions 24 and 26, respectively, temperature change of hot junctions T1 can be increased, thus improving the sensitivity of infrared sensing portion 31 for sensing infrared rays based on the infrared rays absorbed by infrared absorbing portions 24 and 26.

As shown in FIG. 5A, each MOSFET 4 is an electric field-effect transistor, which is formed in p+type well region 41 embedded in the top surface side of semiconductor substrate 201 of support part 22. Each MOSFET 4 is n+type, and includes drain region 42 and source region 43, which are formed apart from each other in a part on the top surface side of well region 41. On the top surface side of well region 41, p++ type channel stopper region 44 is formed so as to surround drain region 42 and source region 43.

Gate insulating film 45 made of a silicon oxide film (thermal oxidation film) is formed on the top surface of well region 41 located between drain region 42 and, source region 43. Gate electrode 46 made of n–type polysilicon is formed on the top surface of gate insulating film 45. Drain electrode 47 and source electrode 48, made of metal including Al, are formed on the top surfaces of drain region 42 and source region 43, respectively. Furthermore, electrode 49 made of metal including Al is formed on the top surface of channel stopper region 44. Gate electrode 46, drain electrode 47, source electrode 48, and electrode 49 are respectively formed so as to fill contact holes (not shown) formed in interlayer insulating film 204.

Each pixel portion 21 includes first wiring 51, second wiring 52, third wiring 53, and fourth wiring 54, which are respectively formed on one side of support part 22. First wiring 51, third wiring 53, and fourth wiring 54 are formed on one side provided with MOSFET 4, while second wiring 52 is formed on one side perpendicular to the side provided with MOSFET 4.

Figure 8:
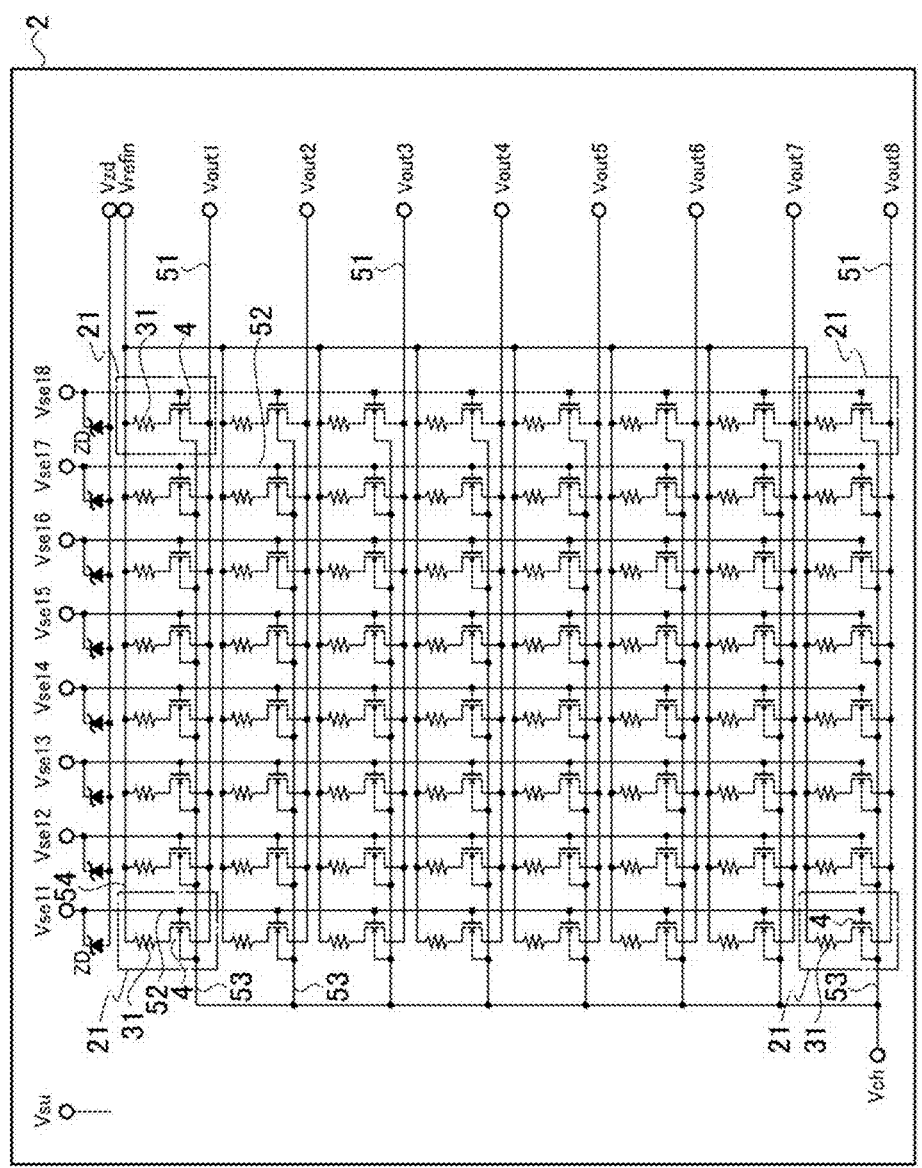
FIG. 8 is an equivalent circuit diagram of the sensor chip included in the infrared sensor in accordance with the exemplary embodiment.

As shown in FIG. 8, first wiring 51, in each column of pixel portion 21, is connected to each of output pads Vout1 to Vout8 and connected to drain electrode 47 of MOSFET 4. Second wiring 52, in each row of pixel portion 21, is connected to each of selective pads Vsel1 to Vsel8 and connected to gate electrode 46 of MOSFET 4. Third wiring 53 is connected to common pad Vch, and is connected to well region 41 of MOSFET 4 of each pixel portion 21. Fourth wiring 54 is connected to reference pad Vref, and is connected to a first end of infrared sensing portion 31 of each pixel portion 21. Reference, pad Vref is connected to reference electric potential. A second end of infrared sensing portion 31 is connected to source electrode 48. In addition, sensor chip 2 includes substrate pad Vsu connected to semiconductor substrate 201.

When electric potential of selective pads Vsel1 to Vsel8 is controlled by IC 15 such that MOSFETs 4 are sequentially turned on, output pads Vout1 to Vout8 can sequentially output an output voltage of each pixel portion 21 to IC 15.

Furthermore, sensor chip 2 includes a plurality of Zener diodes ZD for preventing an over-voltage from being applied between gate electrode 46 and source electrode 48 of each MOSFET 4. In each Zener diode ZD, a cathode is connected to second wiring 52, and an anode is connected to protection pad Vzd.

According to the infrared sensor of the exemplary embodiment, when a plurality of protrusions 6 are disposed apart from each other, an absorption rate of infrared rays by infrared absorbing portions 24 and 26 can be improved, and sensitivity can be enhanced. Also, an increase in heat capacity can be reduced. Note here that it is preferable that the plurality of protrusions 6 is disposed at intervals. Furthermore, when material of protrusion 6 is metal, the sensitivity can be further enhanced. When material of protrusion 6 is a silicon nitride film, tensile stress can be applied, and balance of stress throughout the film can be kept. A film including both metal and material such as a silicon nitride film having tensile stress may be also used for protrusions 6.

Furthermore, according to the infrared sensor of the exemplary embodiment, since protrusion 6 is formed of metal including Al, a manufacturing cost can be reduced.

Furthermore, according to the infrared sensor of the exemplary embodiment, since protrusions 6 are disposed at intervals shorter than the wavelength of the absorbed infrared ray, the absorption rate of infrared rays can be further improved.

Furthermore, since the infrared sensor of the exemplar embodiment includes passivation film 205, the absorption rate of infrared rays can be further improved. In addition, a manufacturing process can employ a step in which protrusion 6 does not have resistance, and restriction in terms of process can be reduced.

Furthermore, in the above mention, FIGS. 5A and 5B disclose a disposition in which a part of the plurality of protrusions 6 are disposed along linear first slit 28. Further ore FIGS. 5A and 5B disclose a disposition which a part of the plurality of protrusions 6 are surrounded by C-shaped second slit 29. However, the configuration is not necessarily limited thereto. For example, FIGS. 9 and 10 show schematic views of a disposition of slits and protrusions disposed in the infrared absorbing portion.

Figure 9:
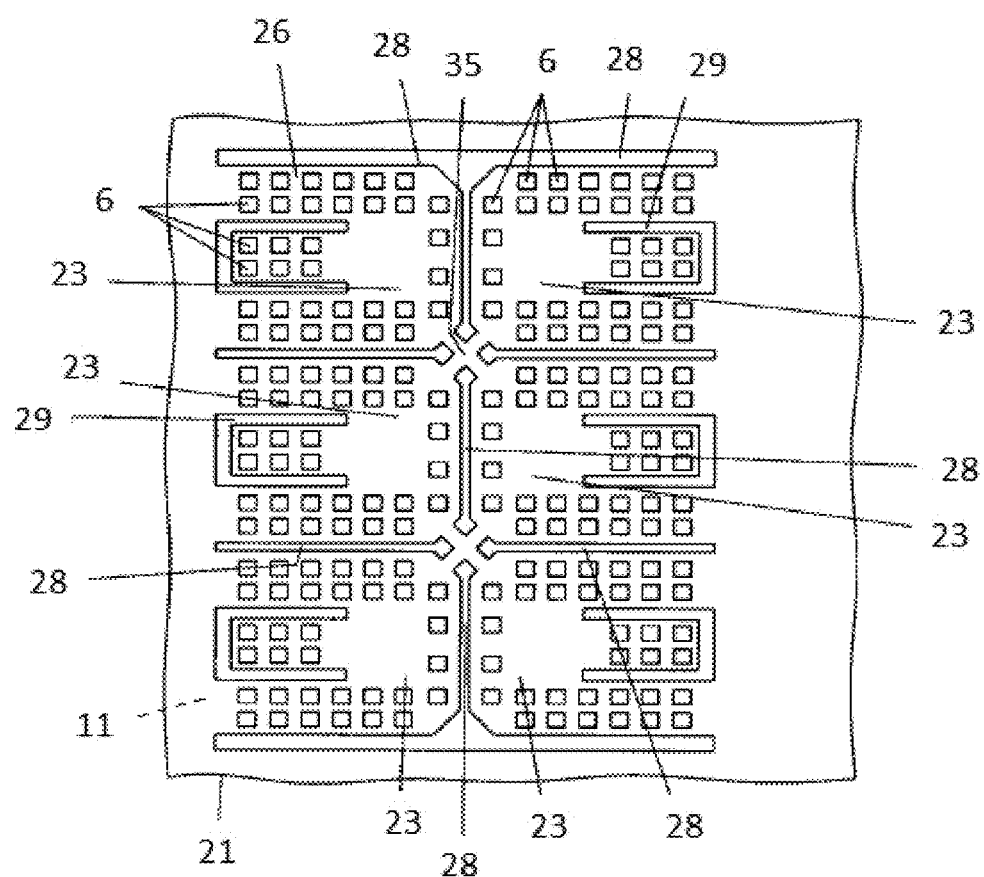
FIG. 9 is a schematic view of disposition of slits and protrusions disposed in the infrared absorbing portion included in the infrared sensor in accordance with the exemplary embodiment.
Figure 10:
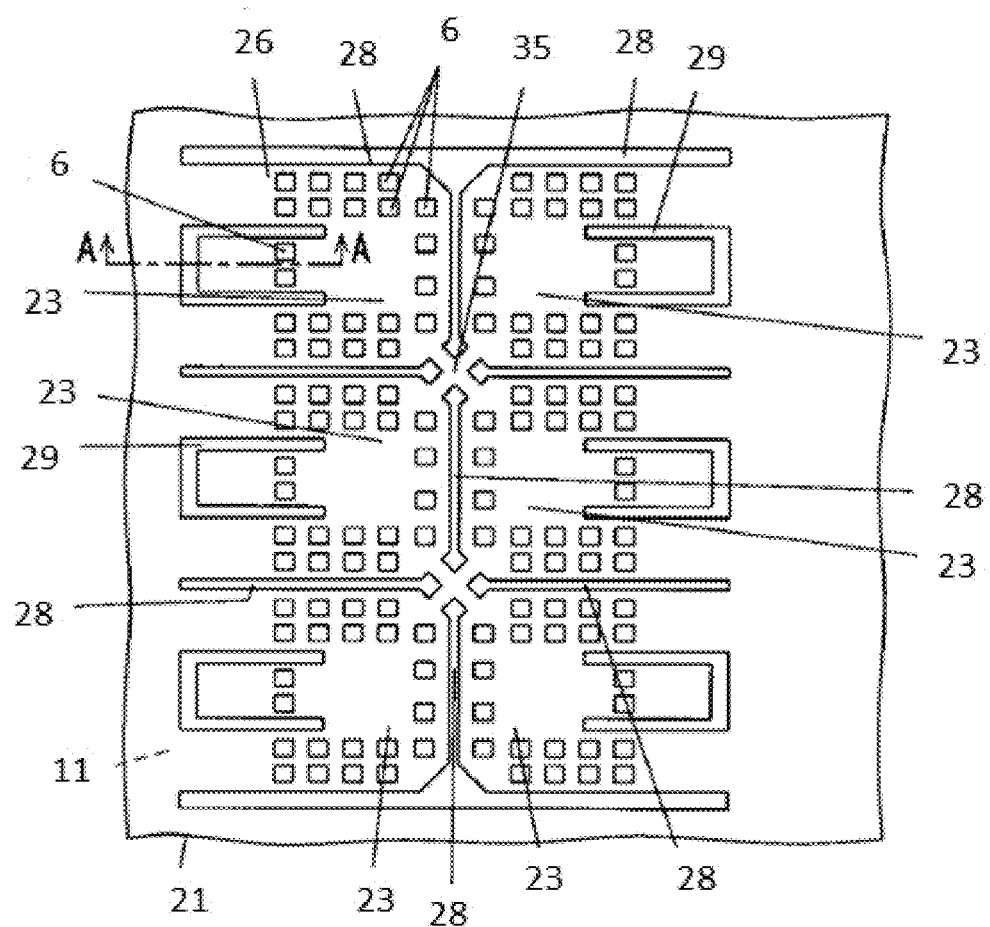
FIG. 10 is a schematic view of disposition of slits and protrusions disposed in the infrared absorbing portion included in the infrared sensor in accordance with the exemplary embodiment.

Firstly, as shown in FIGS. 9 and 10, protrusions 6 may be disposed along linear third slit 28.

Furthermore, FIGS. 5A, 5B, and 9 disclose a state in which protrusions 6 are surrounded by C-shaped second slit 29, and protrusions 6 are disposed along the C-shaped second slit. However, the configuration is not necessarily limited thereto. For example, as shown in FIG. 10, protrusions 6 may not be disposed along all of the C-shaped second slits.

Note here that an infrared sensing portion is not shown in FIGS. 9 and 10, but it only needs to be disposed so as not to be overlapped with protrusions 6.

Other Exemplary Embodiments

As mentioned above, the exemplary embodiment is described, but descriptions and drawings constituting a part of this disclosure are not intended to limit the present invention.

Figure 11:
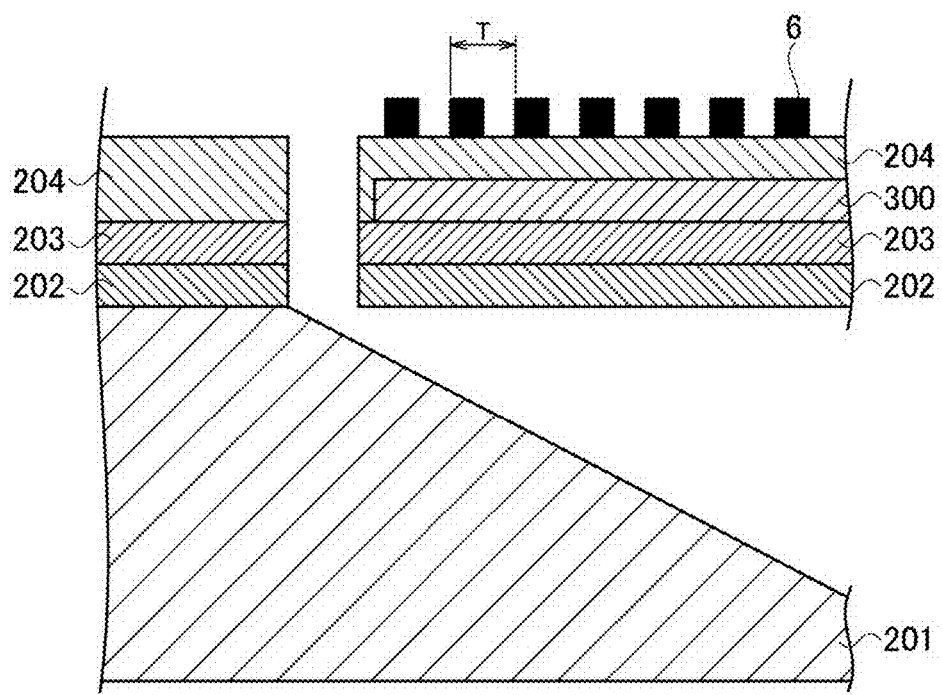
FIG. 11 is an enlarged sectional view for illustrating an infrared absorbing portion of an infrared sensor in accordance with another exemplary embodiment.

For example, in the above-mentioned exemplary embodiment, infrared absorbing portions 24 and 26 may not include passivation film 205 as the second infrared absorbing portion as shown in FIG. 11. Note here that, FIG. 11 shows a sectional schematic view taken on line A-A of FIG. 10.

Figure 12:
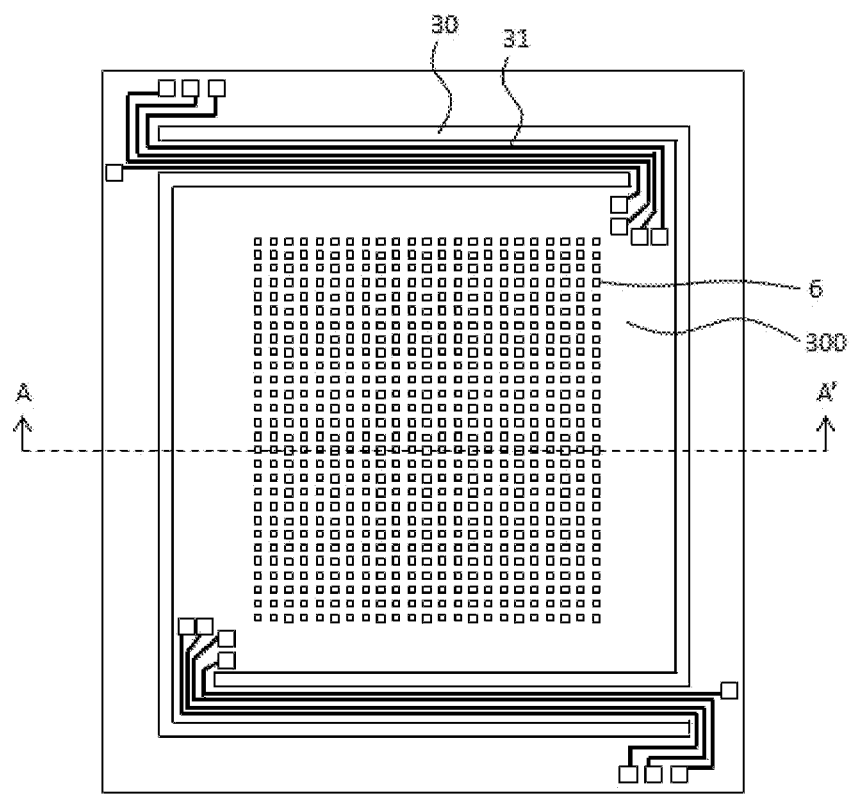
FIG. 12A is a schematic view of an infrared sensor in accordance with a still another exemplary embodiment.
FIG. 12B is a sectional view seen from the A-A' direction of FIG. 12A.
Figure 12:
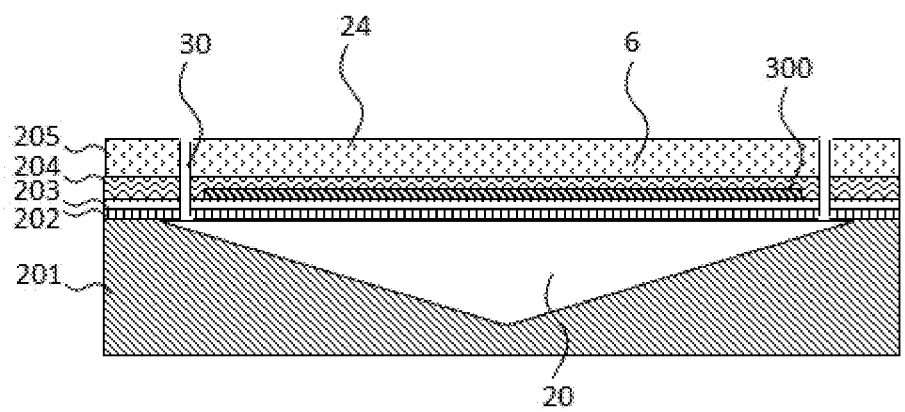

Furthermore, for example, an infrared, sensor shown in FIGS. 12A and 12B may be employed. FIG. 12A shows a schematic plan view of the infrared sensor, and FIG. 12B shows a sectional schematic view taken on line A-A' of FIG. 12A.

In FIGS. 12A and 12B, for example, infrared absorbing portion 24 having polysilicon layer 300 surrounded by slit 30 is disposed above air gap 20. Protrusions 6 are disposed so as to be surrounded by slit 30. Herein, it is preferable that all of protrusions 6 are surrounded by slit 30. Furthermore, it is preferable that protrusions 6 are disposed at intervals such that neighboring protrusions 6 are arranged at substantially an equal interval. Furthermore, it is preferable that a distance between protrusions 6 and slit 30 is longer than a distance between neighboring protrusions 6. Note here that a signal concerning the infrared ray detected by infrared absorbing portion 24 is to be transmitted outside via infrared sensing portion 31 disposed between slits 30.

Furthermore, in the above-mentioned exemplary embodiment, a plane pattern of each protrusion 6 is not limited, to a square shape, but may also be other shapes such as a rectangle, other polygonal shapes, circle, ellipse, and the like.

(Description of Manufacturing Method)

Hereinafter, an example of a method for manufacturing an infrared sensor is described with reference to FIGS. 13A to 16B. FIGS. 13A to 16B correspond to the sectional view taken on line A-A of 5A. FIG. 5B corresponds to FIG. 15B, but FIG. 5B may not completely correspond to FIG. 15B.

Figure 13A:
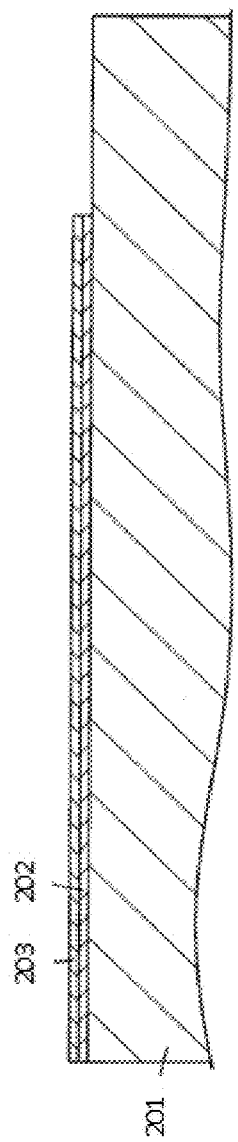
FIG. 13A is a sectional view for illustrating one of main steps of a method for manufacturing the infrared sensor in accordance with the exemplary embodiment.
Figure 13:
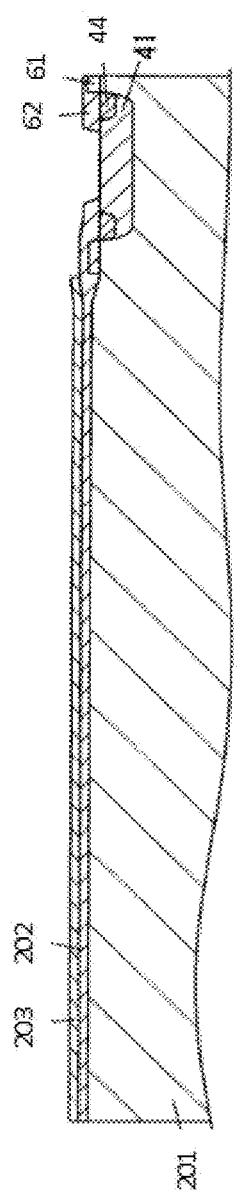
FIG. 13B is a sectional view for illustrating one of main steps of the method for manufacturing the infrared sensor in accordance with the exemplary embodiment.

Hereinafter, a method for forming a structure shown in FIG. 13A is described. Firstly, the method includes a step of forming an insulating layer on one surface side of semiconductor substrate 201 made of an n-type silicon substrate. The insulating layer can be formed of a laminated film of silicon oxide film 202 and silicon nitride film 203. Silicon oxide film 202 can be formed by thermally oxidizing semiconductor substrate 201 by, for example, heating semiconductor substrate 201 to 1100° C. A film thickness of silicon oxide film 202 can be, for example, 0.3 µm. Silicon nitride film 203 can be formed by a LPCVD (Low Pressure Chemical Vapor deposition) method. A film thickness of silicon nitride film 203 can be, for example, 0.1 µm. Silicon nitride film 203 can function as a first stress layer which generates tensile stress on a semiconductor substrate 201 side with respect to the center of the film thickness of infrared absorbing portions 24 and 26 including silicon nitride film 203. Thereafter, the method includes a step of patterning and removing by etching a portion of the insulating layer corresponding to a region for forming MOSFET 4 by using a photolithography technique and an etching technique. As mentioned above, the structure shown FIG. 13A is obtained. In the step of forming the insulating layer, a portion in the insulating layer corresponding to a region for forming infrared sensing portion 31 is left.

Hereinafter, a method for forming a structure shown in FIG. 13B is described. Firstly, the method includes a step of forming first thermal oxidation film 61 made of a silicon oxide film and p-type (p+) well region 41 on one surface side of semiconductor substrate 201. Subsequently, the method includes a step of forming p-type (p++) channel stopper region 44 in well region 41 on one surface side of semiconductor substrate 201, and forming second thermal oxidation film 62 made of a silicon oxide film on one surface side of semiconductor substrate 201. Thereafter, a step of implanting ions to control a threshold voltage of MOSFET 4 is carried out. Note here that as p-type impurities for forming well region 41 and channel stopper region 44, for example, boron can be used. As mentioned above, the structure shown in FIG. 13B is obtained.

Figure 14A:
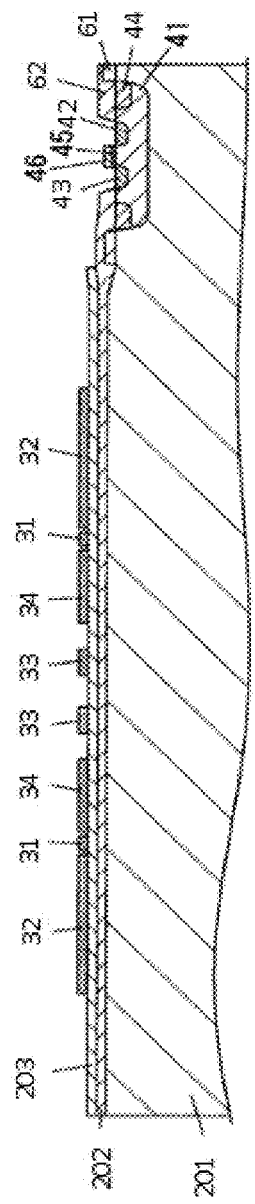
FIG. 14A is a sectional view for illustrating one of main steps of the method for manufacturing the infrared sensor in accordance with the exemplary embodiment.
Figure 14:
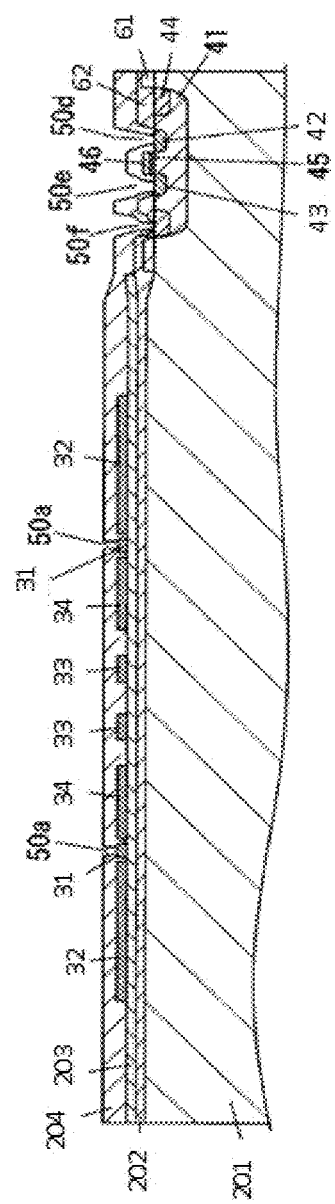
FIG. 14B is a sectional view for illustrating one of main steps of the method for manufacturing the infrared sensor in accordance with the exemplary embodiment.

Hereinafter, a method for forming a structure shown in FIG. 14A is described. Firstly, the method includes a step of forming n-type (n+) drain region 42 and n-type (n+) source region 43 in well region 41. Herein, as n-type impurities for forming drain region 42 and source region 43, for example, n-type impurities such as phosphorus can be used. Thereafter, the method includes a step of forming gate insulating film 45 made of a silicon oxide film having a predetermined film thickness on one surface side of semiconductor substrate 201 by, for example, thermal oxidation. Herein, gate insulating film 45 can be formed of, for example, a thermal oxidation film having a thickness of 60 nm. Thereafter, the method includes a step of forming a non-doped polycrystalline silicon layer on an entire surface at one surface side of semiconductor substrate 201 by the LPCVD method. The non-doped polycrystalline silicon layer is a base for gate electrode 46, infrared absorbing layers 32, 33, and 34, and infrared sensing portion 31. Thereafter, a step of patterning is carried out by using a photolithography technique and an etching technique, such that a portion corresponding to gate electrode 46, infrared absorbing layers 32, 33, and 34, and infrared sensing portion 31 in the non-doped polycrystalline silicon layer is left. Thereafter, to a portion corresponding to gate electrode 46, predetermined infrared absorbing layers 32, 33, and 34, and infrared sensing portion 31 in the non-doped polycrystalline silicon layer, ion implantation of n-type impurities is carried out, and then drive-in is carried out. Herein, as the n-type impurities for the non implantation, for example, phosphorus can be used. As mentioned above, gate electrode 46, predetermined infrared absorbing layers 32, 33, and 34, and infrared sensing portion 31 made of n-type polycrystalline silicon can be formed. Furthermore, to a portion corresponding to predetermined infrared absorbing layers 32, 33, and 34, and infrared sensing portion 31 in the non-doped polycrystalline silicon layer, ion implantation of p-type impurities is carried out, and then drive-in is carried out. Herein, as the p-type impurities for the ion implantation, for example, boron can be used. As mentioned above, predetermined infrared absorbing layers 32, 33, and 34, and infrared sensing portion 31 made of p-type polycrystalline silicon can be used. As mentioned above, the structure shown in FIG. 14A is obtained.

Hereinafter, a method for forming a structure shown in FIG. 14B is described. Firstly, interlayer insulating film 204 is formed so as to cover infrared sensing portion 31, and infrared absorbing layers 32, 33, and 34 on one surface side of semiconductor substrate 201. As a method for forming interlayer insulating film 204, for example, a CVD (Chemical Vapor Deposition) method can be used. As material, a BPSG film can be used. Thereafter, contact hole 50A for hot junction T1 and contact hole 50F for electrode 49 are formed in interlayer insulating film 204 by using a photolithography technique and an etching technique. Note here that electrode 49 is used as, for example, a grounding electrode. Furthermore, contact hole 50E for source electrode 48 and contact hole 50D for drain electrode 47 are formed in interlayer insulating film 204 by using a photolithography technique and an etching technique. As mentioned above, the structure shown in FIG. 14B is obtained.

Figure 15A:
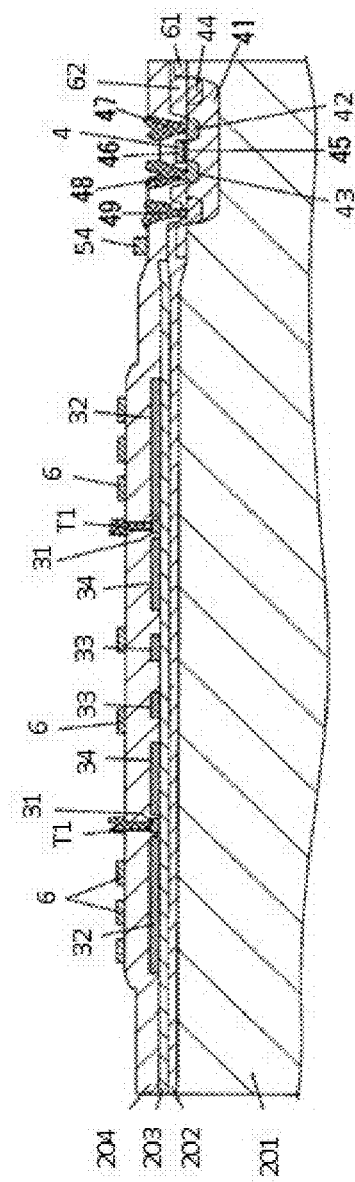
FIG. 15A is a sectional view for illustrating one of main steps of the method for manufacturing the infrared sensor in accordance with the exemplary embodiment.
Figure 15:
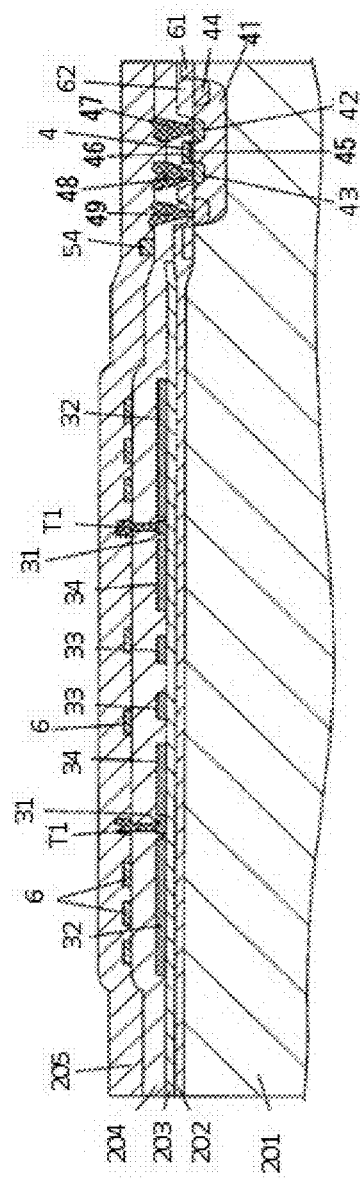
FIG. 15B is a sectional view for illustrating one of main steps of the method for manufacturing the infrared sensor in accordance with the exemplary embodiment.

Hereinafter, a method for forming a structure shown in FIG. 15A is described. Firstly, a metal film as a base for hot junction T1, cold junction T2, a reference bias line, electrode 49, source electrode 48, drain electrode 47, and the like, is formed on the entire surface at one surface side of semiconductor substrate 201. Examples of the method for forming the metal film include a sputtering method, a CVD method, a vapor deposition method, and the like. Herein, as material for the metal film, for example, Al—Si can be used. A thickness of the metal film may be, for example, 2 μm. Thereafter, hot junction T1, the reference bias line, electrode 49, source electrode 48, drain electrode 47, and the like, are formed by patterning the metal film. As the patterning method, for example, a photolithography technique and an etching technique such as RIE (Reactive Ion Etching) can be used. Thereafter, protrusions 6 are formed to the center of the film thickness of infrared absorbing portions 24 and 26 on the opposite side to semiconductor substrate 201. Protrusion 6 can function as a second stress layer which generates tensile stress. In order to form protrusion 6, a film for forming protrusion 6 is formed on the BPSG film constituting a part of interlayer insulating film 204. Herein, examples of material for forming protrusion 6 preferably include metal including aluminum (Al), titanium (Ti), tungsten (W), gold (Au), and copper (Cu), or an aluminum alloy such as Al—Si, Al—Si—Cu, or Al—Cu, or metal nitride such as TiN, or a silicon nitride film. Note here that, a film for forming protrusion 6 may be formed to have a film thickness of, for example, 0.1 μm. Thereafter, by using a photolithography technique and an etching technique, protrusions 6 are formed by patterning the film such that a plurality of islands are arranged at a predetermined interval in a plan view of infrared absorbing portions 24 and 26. As mentioned above, the structure show in FIG. 15A is obtained. Herein, each protrusion 6 is formed square shape in a plan view. Note here that the shape of protrusion 6 is not limited to a square, but can be various shapes such as a rectangle, a rhombus, a triangle, polygons with five or more sides and angles, a circle, an ellipse, and a star-shape. Protrusions 6, each having a triangle shape in a plan view, can be easily formed corresponding to the outer shape of infrared absorbing portion 4 without a gap. When a silicon nitride filmy as used for a film for form g protrusion 6, the film can be formed by, for example, a LPCVD method, and a sputtering method. The film can also adjust the tensile stress of the film itself by adjusting the film formation methods and film formation conditions. The stress of the film can be measured by using UV-Raman spectroscopy and the like.

Hereinafter, a method for forming a structure shown in FIG. 15B is described. Firstly, passivation film 205 made of a laminated film of a PSG film and a NSG film can be formed on one surface side of semiconductor substrate 201. Herein, the PSG film can be formed to have a thickness of, for example, 0.5 μm. The NSG film can be formed to have a thickness of, for example, 0.5 μm. In the step of forming passivation film 205, passivation film 205 is formed by a CVD method. As mentioned above, the structure shown in FIG. 15B is obtained.

Figure 16A:
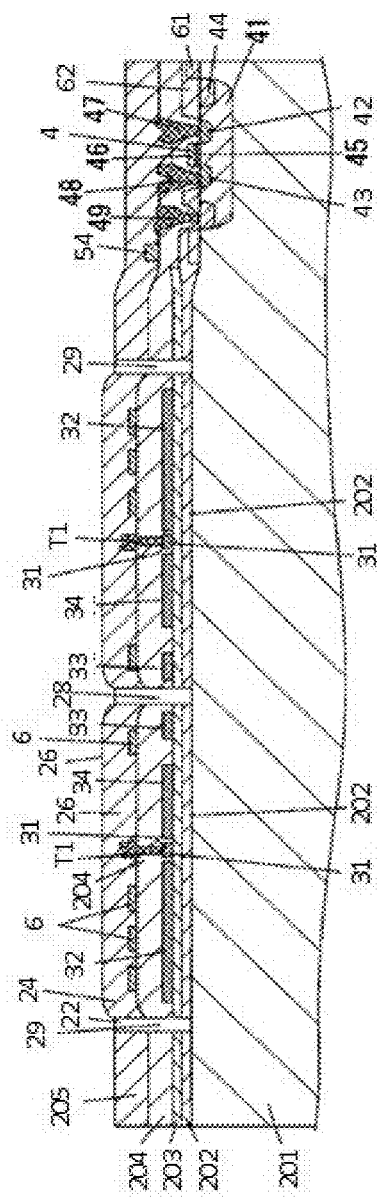
FIG. 16A is a sectional view for illustrating one of main steps of the method for manufacturing the infrared sensor in accordance with the exemplary embodiment.
Figure 16:
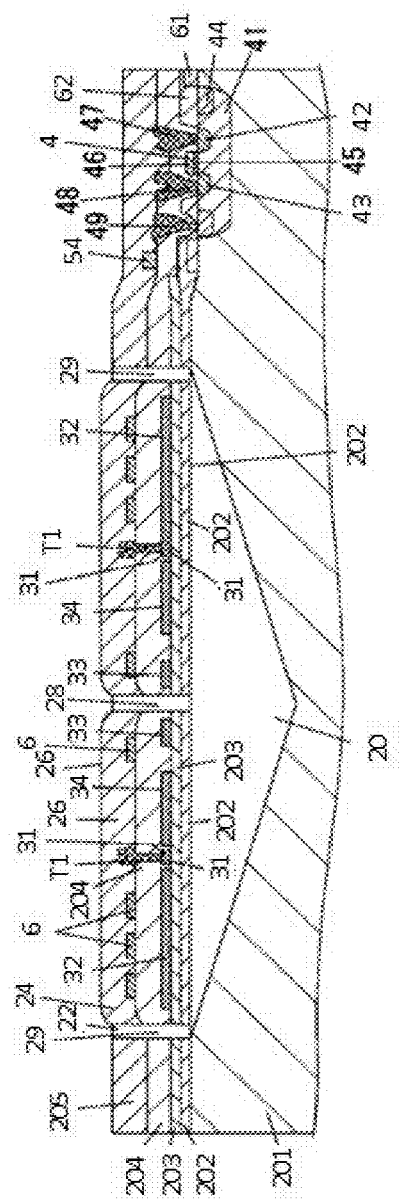
FIG. 16B is a sectional view for illustrating one of main steps of the method for manufacturing the infrared sensor in accordance with the exemplary embodiment.

Hereinafter, a method for forming a structure shown in FIG. 16A is described. Firstly, openings as first and third slits 28 and second slit 29 are formed in a multilayered film including silicon oxide film 202, silicon nitride film 203, interlayer insulating film 204, passivation film 205, and the like. Examples of the forming methods include a photolithography technique and an etching technique such as RIE. As mentioned above, the structure shown in FIG. 16A is obtained.

Hereinafter, a method for forming a structure shown in FIG. 16B is described. Firstly, semiconductor substrate 201 is subjected to anisotropic etching by introducing an etchant into openings for first and third slits 28 and second slit 29 as etchant-introducing holes. Thus, air-gap 20 can be formed in semiconductor substrate 201. An example of the etchant may be, but not limited to, a TMAH (Tetramethyl Ammonium Hydroxide) solution and the like heated to 85° C. As the etchant, for example, alkaline solutions such as a KOH solution may be used. As mentioned above, the structure shown in FIG. 16B is obtained.

Note here that after all the steps are carried out on a wafer level until the step of forming the structure shown in FIG. 16B is completed, the wafer is divided into a plurality of infrared sensors to form a plurality of infrared sensor chips.

INDUSTRIAL APPLICABILITY

An infrared sensor of the present invention is useful because it can achieve a low manufacturing cost, or have high sensitivity, or can reduce an increase in heat capacity.

The invention claimed is:

1. An infrared sensor comprising:
   a semiconductor substrate;
   a first infrared absorbing portion provided on the semiconductor substrate, having a first surface facing the semiconductor substrate and a second surface opposite to the first surface;
   an infrared sensing portion for sensing infrared rays based on infrared rays absorbed by the first infrared absorbing portion;
   a plurality of protrusions including metal or a silicon nitride film, and disposed apart from each other on the second surface of the first infrared absorbing portion; and
   a second infrared absorbing portion, which is formed so as to contact and cover a top surface and a side surface of the plurality of protrusions, and which is provided on top surfaces of the first infrared absorbing portion,
   wherein spaces between adjacent protrusions of the plurality of protrusions are wholly filled with the second infrared absorbing portion such that there is no gap between adjacent protrusions.

2. The infrared sensor of claim 1, wherein
   the first infrared absorbing portion is provided with a slit in a plan view, and all of the plurality of protrusions are surrounded by the slit.

3. The infrared sensor of claim 2, wherein a distance between neighboring protrusions of the protrusions and the slit is longer than a distance between the neighboring protrusions.

4. The infrared sensor of claim 1, wherein the first infrared absorbing portion is provided with a linear first slit in a plan view, and
   a part of the plurality of protrusions are disposed along the first slit.

5. The infrared sensor of claim 4, wherein the first infrared absorbing portion is provided with a C-shaped second slit in a plan view,
   the first infrared absorbing portion is provided with a linear third slit in a plan view, an extending direction of the first slit is perpendicular to an extending direction of the third slit, and a part of the protrusions are disposed along the third slit.

6. The infrared sensor of claim 1, wherein the first infrared absorbing portion is provided with a linear first slit in a plan view, the first infrared absorbing portion is provided with a C-shaped second slit in a plan view, and a part of the plurality of protrusions are disposed to be surrounded by the second slit.

7. The infrared sensor of claim 6, wherein a part of the plurality of protrusions are disposed along the second slit.

8. The infrared sensor of claim 6, wherein the first infrared absorbing portion is provided with a linear third slit in a plan view, an extending direction of the first slit is perpendicular to an extending direction of the third slit, and a part of the protrusions are disposed along the third slit.

9. The infrared sensor of claim 1, wherein the plurality of protrusions are disposed at intervals shorter than a wavelength of infrared rays absorbed by the first infrared absorbing portion.

10. The infrared sensor of claim 1, wherein the first infrared absorbing portion includes an interlayer insulating film, and the plurality of protrusions are disposed on the interlayer insulating film.

11. An infrared sensor comprising:

a semiconductor substrate;

a first infrared absorbing portion provided on the semiconductor substrate, having a first surface facing the semiconductor substrate and second surface opposite to the first surface;

an infrared sensing portion for sensing infrared rays based on infrared rays absorbed by the first infrared absorbing portion;

a plurality of protrusions including metal or a silicon nitride film, and disposed apart from each other on the second surface of the first infrared absorbing portion; and a single second infrared absorbing portion, which is formed so as to contact and cover an entire top surface and an entire side surface of each of the plurality of protrusions and a top surface of the first infrared absorbing portion, wherein the plurality of protrusions and the single second infrared absorbing portion are made of different materials.

12. The infrared sensor of claim 11, wherein the plurality of protrusions are made of metal including aluminum, the second infrared absorbing portion is made of a non-doped silicate glass or phosphorus silicate glass.

13. The infrared sensor of claim 11, wherein the first infrared absorbing portion is provided with a slit in a plan view, and all of the plurality of protrusions are surrounded by the slit.

14. The infrared sensor of claim 13, wherein a distance between the protrusions and the slit is longer than a distance between neighboring protrusions of the neighboring protrusions.

15. The infrared sensor of claim 11, wherein the first infrared absorbing portion is provided with a linear first slit in a plan view, and a part of the plurality of protrusions are disposed along the first slit.

16. The infrared sensor of claim 15, wherein the first infrared absorbing portion is provided with a C-shaped second slit in a plan view, the first infrared absorbing portion is provided with a linear third slit in a plan view, an extending direction of the first slit is perpendicular to an extending direction of the third slit, and a part of the protrusions are disposed along the third slit.

17. The infrared sensor of claim 11, wherein the first infrared absorbing portion is provided with a linear first slit in a plan view, the first infrared absorbing portion is provided with a C-shaped second slit in a plan view, and a part of the plurality of protrusions are disposed to be surrounded by the second slit.

18. The infrared sensor of claim 17, wherein a part of the plurality of protrusions are disposed along the second slit.

19. The infrared sensor of claim 17, wherein the first infrared absorbing portion is provided with a linear third slit in a plan view, an extending direction of the first slit is perpendicular to an extending direction of the third slit, and a part of the protrusions are disposed along the third slit.

20. The infrared sensor of claim 11, wherein the plurality of protrusions are disposed at intervals shorter than a wavelength of infrared rays absorbed by the first infrared absorbing portion.

21. The infrared sensor of claim 11, wherein the first infrared absorbing portion includes an interlayer insulating film, and the plurality of protrusions disposed on the interlayer insulating film.

* * * * *